United States Patent [19]

Penokie

[11] Patent Number: 5,854,942
[45] Date of Patent: Dec. 29, 1998

[54] METHOD AND SYSTEM FOR AUTOMATIC STORAGE SUBSYSTEM CONFIGURATION

[75] Inventor: George Oliver Penokie, Rochester, Minn.

[73] Assignee: International Business Machines Corporation, Armonk, N.Y.

[21] Appl. No.: 711,695

[22] Filed: Sep. 6, 1996

[51] Int. Cl.⁶ ................................................. G06F 11/20
[52] U.S. Cl. .......................................... 395/830; 711/170
[58] Field of Search ................................... 395/821, 822, 395/826, 830, 853, 856, 857, 861, 880, 882, 885, 892, 800.15, 182.03, 182.04, 181.05; 711/111, 112, 114, 170, 171, 172, 173

[56] References Cited

U.S. PATENT DOCUMENTS

| | | | |
|---|---|---|---|
| 4,374,412 | 2/1983 | Schaffner | 364/200 |
| 4,803,623 | 2/1989 | Klashka et al. | 364/200 |
| 5,148,432 | 9/1992 | Gordon et al. | 371/10.1 |
| 5,257,387 | 10/1993 | Richek et al. | 395/800 |
| 5,263,145 | 11/1993 | Brady | 711/114 |
| 5,345,565 | 9/1994 | Jibbe et al. | 395/325 |
| 5,345,584 | 9/1994 | Hill | 711/170 |
| 5,375,233 | 12/1994 | Kimber et al. | 711/171 |
| 5,440,737 | 8/1995 | Uchinuma | 711/114 |
| 5,442,752 | 8/1995 | Styczinski | 395/404 |
| 5,463,765 | 10/1995 | Kakuta et al. | 711/114 |
| 5,471,603 | 11/1995 | Yokote et al. | 395/402 |
| 5,479,653 | 12/1995 | Jones | 395/182.03 |
| 5,485,609 | 1/1996 | Vitter et al. | 395/600 |
| 5,488,694 | 1/1996 | McKee et al. | 395/824 |
| 5,502,836 | 3/1996 | Hale et al. | 711/170 |
| 5,506,815 | 4/1996 | Hsieh et al. | 365/230.03 |
| 5,511,227 | 4/1996 | Jones | 395/829 |
| 5,515,515 | 5/1996 | Kennedy et al. | 395/283 |
| 5,524,204 | 6/1996 | Verdoorn, Jr. | 711/114 |
| 5,542,065 | 7/1996 | Burkes et al. | 711/114 |
| 5,657,468 | 8/1997 | Stallmo et al. | 711/114 |
| 5,659,704 | 8/1997 | Burkes et al. | 711/114 |
| 5,664,187 | 9/1997 | Burkes et al. | 711/114 |
| 5,680,539 | 10/1997 | Jones | 395/185.04 |
| 5,682,273 | 10/1997 | Hetzler | 360/75 |

OTHER PUBLICATIONS

Gibson, "Performance and Reliability in Redundant Arrays of Inexpensive Disks", University of California at Berkeley, pp. 381, 383, 385, 387, 389, 391.

Patterson et al., A Case for Redundant Arrays of Inexpensive Disks (RAID), International Conference on Management of Data, Jun. 1988, Illinois, pp. 109–116.

*Primary Examiner*—Joseph Palys
*Attorney, Agent, or Firm*—Andrew J. Dillon

[57] ABSTRACT

An automatically configurable storage subsystem for use in conjunction with a computer system. The storage subsystem includes a storage controller attached to the computer system and multiple data storage devices which are configurable in multiple diverse arrays. A data transfer parameter is specified by a user which preferably sets forth an estimated average size of a future data transfer and/or an estimated percentage of future sequential data transfers. The data transfer parameter(s) is then coupled to the storage controller and is utilized to automatically configure at least certain of the multiple data storage devices into an appropriate array for future data transfers.

8 Claims, 8 Drawing Sheets

| Bit<br>Byte | 7 | 6 | 5 | 4 | 3 | 2 | 1 | 0 |
|---|---|---|---|---|---|---|---|---|
| 0 | OPERATION CODE(BFh) | | | | | | | |
| 1 | RESERVED | | | COMMAND(08h) | | | | |
| 2 | RESERVED | | | | | | | |
| 3 | RESERVED | | | | | | | |
| 4 | (MSB) | | | | | | | |
| 5 | | | | LUN_V | | | | |
| 6 | (MSB) | | | | | | | (LSB) |
| 7 | | | | LIST LENGTH | | | | |
| 8 | | | | 52 | | | | |
| 9 | | | | | | | | (LSB) |
| 10 | CRTMOD | SETLUN | CONFIGURE | RESERVED | | | | IMMED |
| 11 | CONTROL | | | | | | | |

Fig. 3

| Codes | Description |
|---|---|
| 00b | The storage subsystem shall use the SIMPLE CREATE/MODIFY VOLUME SET parameter list (*Fig. 5*) to determine the configuration of the volume set. |
| 01b | Any unassigned ps_extent(s) within the SCSI-3 storage array that received the SIMPLIFY CREATE/MODIFY VOLUME SET command may be used to configure the selected volume set to the requested capacity. All the CREATE/MODIFY PERIPHERAL DEVICE DESCRIPTORS (*Fig. 6*) shall be ignored. |
| 10b | All unassigned ps_extents within the SCSI-3 storage array that received the SIMPLIFY CREATE/MODIFY VOLUME SET command shall be configured into a volume set. The VOLUME SET CAPACITY field (*Fig. 5*) and all the CREATE/MODIFY PERIPHERAL DEVICE DESCRIPTORS (*Fig. 6*) shall be ignored. |
| 11b | All peripheral device(s) within the SCSI-3 storage array that received the SIMPLIFY CREATE/MODIFY VOLUME SET command shall be configured into a single volume set. The VOLUME SET CAPACITY field (*Fig. 5*) and all the CREATE/MODIFY PERIPHERAL DEVICE DESCRIPTORS (*Fig. 6*) shall be ignored. All fields within the SIMPLE CREATE/MODIFY VOLUME SET parameter list (*Fig. 5*) shall be ignored. If any volume set(s) have been configured within the SCSI-3 storage array the command shall be terminated with a CHECK CONDITION status. The sense key shall be set to ILLEGAL REQUEST, and the additional sense code set to INVALID FIELD IN CDB. |

*Fig. 4*

| Bit<br>Byte | 7 | 6 | 5 | 4 | 3 | 2 | 1 | 0 |
|---|---|---|---|---|---|---|---|---|
| 0 | (MSB) | | | | | | | |
| 1 | | | | VOLUME SET CAPACITY | | | | |
| 2 | | | | | | | | |
| 3 | | | | | | | | (LSB) |
| 4 | (MSB) | | | NORMAL USER DATA TRANSFER SIZE | | | | |
| 5 | | | | | | | | (LSB) |
| 6 | RESERVED | | | | | | | |
| 7 | PERCENTAGE OF SEQUENTIAL TRANSFERS | | | | | | | |
| | CREATE/MODIFY PERIPHERAL DEVICE DESCRIPTOR(S)(if any) | | | | | | | |
| 8 | CREATE/MODIFY PERIPHERAL DEVICE DESCRIPTOR0 | | | | | | | |
| 27 | | | | | | | | |
| | ⋮ | | | | | | | |
| n-19 | CREATE/MODIFY PERIPHERAL DEVICE DESCRIPTORx | | | | | | | |
| n | | | | | | | | |

*Fig. 5*

| Bit<br>Byte | 7 | 6 | 5 | 4 | 3 | 2 | 1 | 0 |
|---|---|---|---|---|---|---|---|---|
| 0 | LUN_P | | | | | | | |
| 1 | | | | | | | | |
| 14 | LUN_R | | | | | | | |
| 15 | | | | | | | | |
| 16 | RESERVED | | | | | | | |
| 17 | RESERVED | | | | | | | |
| 18 | RESERVED | | | | | | | |
| 19 | PERCENT OF USER DATA | | | | | | | |

*Fig. 6*

METHOD AND SYSTEM FOR AUTOMATIC STORAGE SUBSYSTEM CONFIGURATION

BACKGROUND OF THE INVENTION

1. Technical Field:

The present invention relates in general to an improved data processing system and in particular to an improved data storage subsystem for use in conjunction with a computer system. Still more particularly, the present invention relates to an improved data storage subsystem which is automatically configurable into an appropriate array of data storage devices in response to a specification of estimated future data transfer parameters.

2. Description of the Related Art:

Recent and continuing increases in computer processing power and speed, in the speed and capacity of primary memory, and in the size and complexity of computer software has resulted in a need for faster operating, larger capacity secondary memory storage devices; magnetic disks forming the most common external or secondary memory storage system utilized in present day computer systems. Unfortunately, the rate of improvement in the performance of large magnetic disks has not kept pace with processor and main memory performance improvements. However, significant secondary memory storage performance and cost improvements may be obtained by the replacement of single large expensive disk drives with multiple small inexpensive disk drives interconnected in a parallel array, which appears to the computer system as a single large fast disk.

Several disk array design alternatives have been presented in an article entitled "A Case for Redundant Arrays of Inexpensive Disks (RAID)" by David A. Patterson, Garth Gibson and Randy H. Katz; University of California, Report No. UCB/CSD 87/391, December 1987. That article, which is incorporated herein by reference thereto, discusses disk arrays and the improvements in performance, reliability, power consumption and scalability that disk arrays may provide in comparison to a single large magnetic disk.

Five disk array arrangements, referred to as RAID levels, are described within the article. The first level RAID, or RAID 1, comprises N disk for storing data and N additional "mirror" disk for storing copies of the information written to the data disk. RAID 1 write functions require that data be written to two disks, the second "mirror" disk receiving the same information provided to the first disk. When data is read, it can be read from either disk.

RAID 2 incorporates the utilization of a Hamming Code for error correction by bit-interleaving data across the disk of each group and adding sufficient check disk to detect and correct a single error. For large writes, a RAID 2 system has the same level of performance as RAID 1, even though it utilizes fewer check disks, and so on a per disk basis out performs RAID 1. However, for small data transfers the performance is dismal either for the whole system or per disk; in that all disk of a group must be accessed for a small transfer, limiting the maximum number of simultaneous accesses. Thus, RAID 2 is desirable for utilization in so23 called "super computers" but inappropriate for transaction processing systems, with increasing group size increase in the disparity and performance per disk for the two applications.

RAID 3 systems comprise one or more groups of N+1 disk. Within each group, N disks are utilized to store data and the additional disk is utilized to store parity information. During RAID 3 write functions, each block of data is divided into N portions for storage among the N data disk. The corresponding parity information is then written to a dedicated parity disk. When data is read, all N disks must be accessed. The parity disk is used to reconstruct information in the event of a disk failure.

RAID 4 systems are also comprised of one or more groups of N+1 disk, wherein N disks are used to store data and the additional disk is utilized to store parity information. RAID 4 systems differ from RAID 3 systems in that data to be saved is divided into larger portions, consisting of one or many blocks of data, for storage among the disks. Writes still require access to two disks, i.e. one of the N data disk and the parity disk. In a similar fashion, read operations typically need only access a single one of the N data disks, unless the data to be read exceeds the block length stored on each disk. As with RAID 3 systems, the parity disk is utilized to reconstruct information in the event of a disk failure.

Finally, RAID 5 systems are similar to RAID 4 systems except that parity information, in addition to the data, is distributed across the N+1 disk in each group. Although each group contains N+1 disk, each disk includes some blocks for storing data and some blocks for storing parity information. Where parity information is stored is controlled by an algorithm implemented by the user. As in RAID 4 systems, RAID 5 writes require access to at least two disks; however, no longer does every write to a group require access to the same dedicated parity disk, as in RAID 4 systems. This feature provides the opportunity to perform concurrent write operations.

As those skilled in the art will appreciate upon reference to the foregoing, the multiple diverse arrays which are possible utilizing multiple data storage devices, each have a specific application in which that particular array is more appropriate than other possible arrays. Consequently, it would be useful to be able to automatically configure a data storage subsystem into an appropriate array for a particular operating environment without requiring a user to be aware of the complex parameters necessary to configure an array of data storage devices.

SUMMARY OF THE INVENTION

It is therefore one object of the present invention to provide an improved data processing system.

It is another object of the present invention to provide an improved data storage subsystem for utilization in conjunction with a computer system.

It is yet another object of the present invention to provide an improved data storage subsystem which is automatically configurable into an appropriate array of data storage devices in response to a specification of estimated future data transfer parameters.

The foregoing objects are achieved as is now described. An automatically configurable storage subsystem is disclosed for use in conjunction with a computer system. The storage subsystem includes a storage controller attached to the computer system and multiple data storage devices which are configurable in multiple diverse arrays. A data transfer parameter is specified by a user which preferably sets forth an estimated average size of a future data transfer and/or an estimated percentage of future sequential data transfers. The data transfer parameter(s) is then coupled to the storage controller and is utilized to automatically configure at least certain of the multiple data storage devices into an appropriate array for future data transfers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates, in tabular form, a command utilized to create a new volume set within the storage subsystem or to modify an existing volume set, in accordance with the method and system of the present invention;

FIG. 4 illustrates, in tabular form, the CONFIGURE field of the table of FIG. 3;

FIG. 5 illustrates, in tabular form, a parameter list containing user data mapping information and descriptors which may be combined to create or modify an additional volume set in accordance with the method and system of the present invention;

FIG. 6 illustrates, in tabular form, the CREATE/MODIFY PERIPHERAL DEVICE DESCRIPTOR field the table of FIG. 5;

DETAILED DESCRIPTION OF PREFERRED EMBODIMENT

Figure 1:
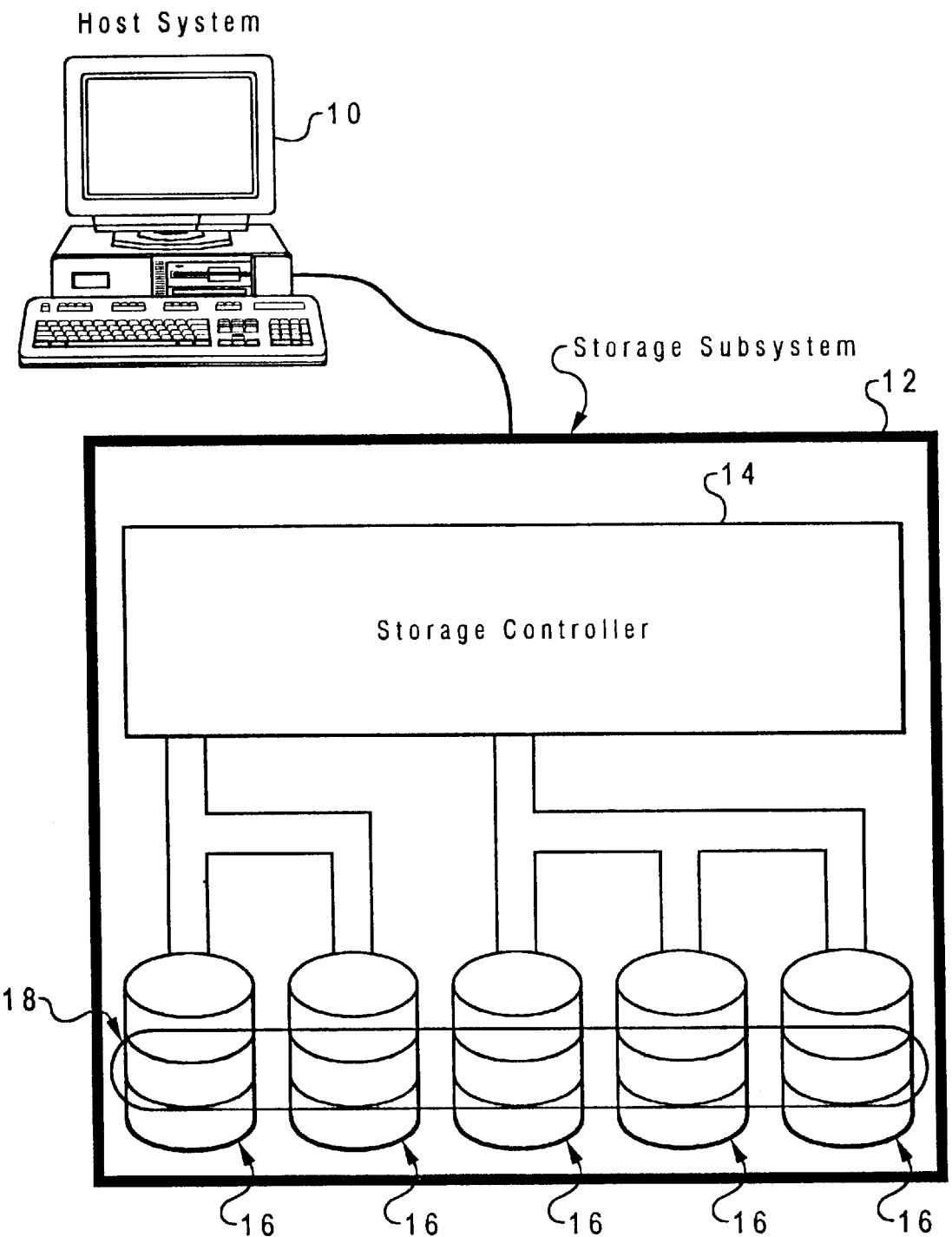
FIG. 1 is a partially pictorial, high level block diagram of a computer system and associated storage subsystem which may be utilized to implement the method and system of the present invention.

With reference now to the figures and in particular with reference to FIG. 1, there is depicted a partially pictorial high level block diagram of a computer system and associated storage subsystem which may be utilized to implement the method and system of the present invention. As illustrated, FIG. 1 includes a host system 10 which communicates with storage subsystem 12. Storage subsystem 12 includes a storage controller 14 and a plurality of data storage devices 16, which communicate with host system 10 via storage controller 14. As depicted, stripes of user data 18 may be implemented across one or more of data storage devices 16. In the depicted embodiment of the present invention storage controller 14 and data storage devices 16 preferably comprise a Model No. 9337 disk array subsystem manufactured by International Business Machines Corporation of Armonk, New York.

Figure 2:
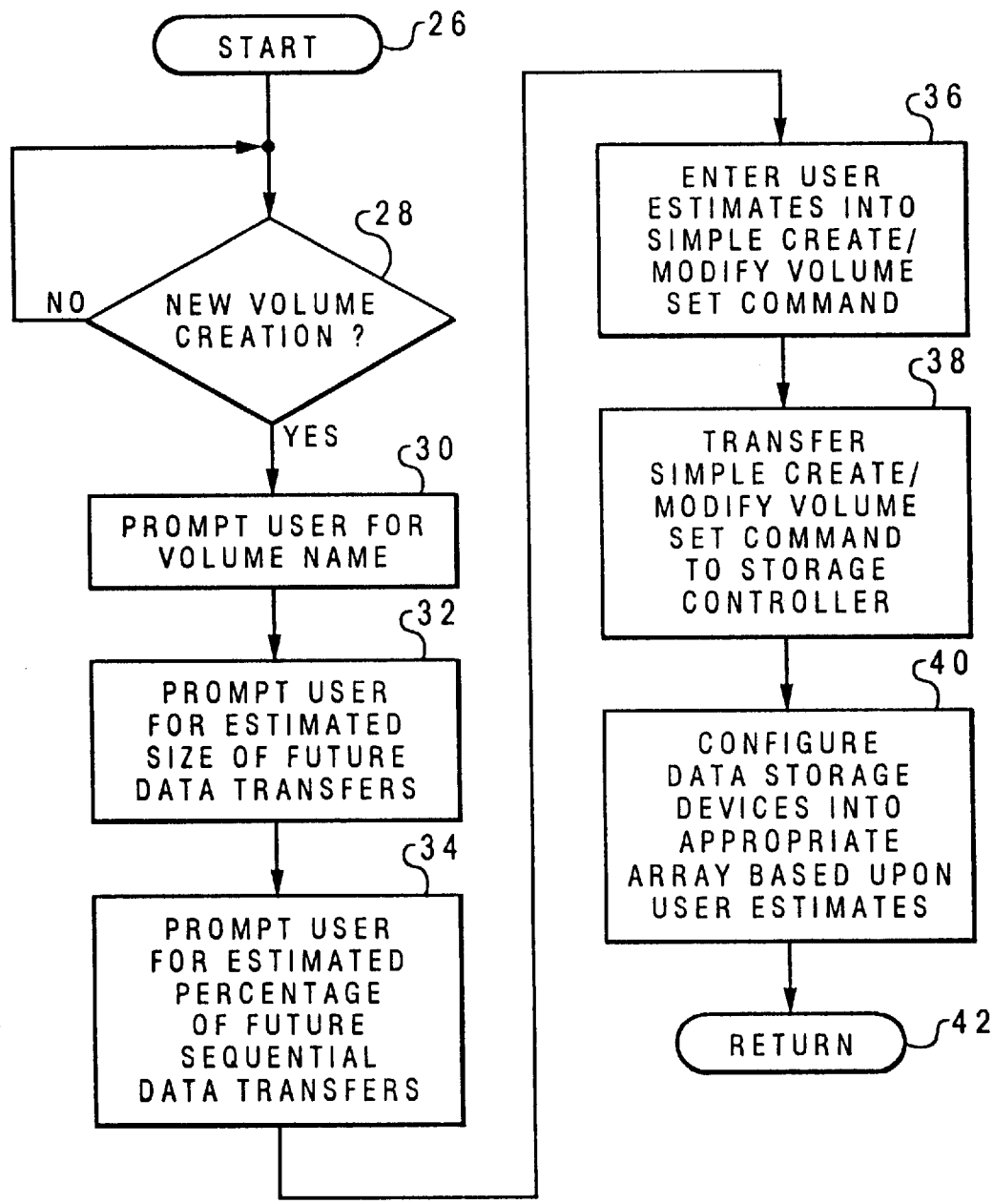
FIG. 2 is a high level logic flow chart illustrating automatic configuration of a storage subsystem in accordance with the method and system of the present invention.

Next, referring to FIG. 2, there is depicted a high level logic flow chart which illustrates the automatic configuration of a storage subsystem in accordance with the method and system of the present invention. As depicted, this process begins at block 26, thereafter passes to block 28. Block 28 illustrates a determination of whether or not a new volume of storage is to be created within storage subsystem 12. If not, the process merely returns, in an iterative fashion, until such time as a new volume creation is indicated.

Next, after a determination that a new volume creation will occur, the process passes to block 30. Block 30 illustrates a prompting of the user for a volume name. Those having ordinary skill in the art will appreciate that "user" as utilized within the present application may comprise an individual utilizing a terminal coupled to host system 10, or a software module operating within host system 10 without direct human intervention.

Next, the process passes to block 32. Block 32 illustrates the prompting of the user for the estimated size of future data transfers. In accordance with the depicted embodiment of the present invention, the estimated size of future data transfers may be selected from a scaled list of possible data transfer sizes.

Next, the process passes to block 34. Block 34 depicts the prompting of the user for an estimated percentage of future sequential data transfers. That is an estimated percentage of how many future data transfers will occur from sequential storage locations.

Next, as depicted at block 36, user estimates of the estimated size of future data transfers and the estimated percentage of future sequential data transfers are entered into a SIMPLE CREATE/MODIFY VOLUME SET command, in a manner which will be set forth in greater detail herein. The SIMPLE CREATE/MODIFY VOLUME SET command, as utilized within the method and system of the present invention, comprises an addition command for utilization with a standard SCSI-3 controller command.

Next, as depicted at block 38, the SIMPLE CREATE/MODIFY VOLUME SET command is transferred to the storage controller.

Finally, as depicted in block 40, the data storage devices attached to the storage controller are configured into an appropriate array based upon the user estimates of size of future data transfers and the percentage of future sequential data transfers. The process then returns, as depicted at block 42.

With reference now to FIG. 3, there is illustrated, in tabular form, the SIMPLE CREATE/MODIFY VOLUME SET command described above. This command, as set forth in table 50, requests the creation of a new volume set. If this create operation fails to complete successfully, an error will be communicated to the host system. Depicted within table 50 is the LUN_V field which specifies the address of the volume set to be created, an immediate (IMMED) bit of zero indicating that the status shall be returned after the CREATE/MODIFY VOLUME SET operation has been completed. An immediate (IMMED) bit value of one indicates that the storage subsystem shall return status as soon as the command descriptor block has been validated and the entire SIMPLE CREATE/MODIFY VOLUME SET parameter list has been transferred. Additionally, in accordance with an important feature of the present invention, a CONFIGURE field 52 is set forth within table 50.

Next, referring to FIG. 4, there is illustrated, in tabular form, CONFIGURE field 52 of FIG. 3. As depicted, four different codes are set forth within table 54, each code having associated therewith a particular description. Thus, as depicted within FIG. 4, code 00b indicates that the storage subsystem shall use the SIMPLE CREATE/MODIFY VOLUME SET parameter list as illustrated in FIG. 5, to determine the configuration of the volume set. Similarly, the remaining codes within column 56 each correspond to a particular action set forth within column 58. Utilizing either the parameter list which will be set forth in greater detail in FIG. or the CREATE/MODIFY PERIPHERAL DEVICE DESCRIPTORS set forth within FIG. 6.

With reference now to FIG. 5, there is depicted, in tabular form, a SIMPLE CREATE/MODIFY VOLUME SET parameter list, within table 62. This table contains user data mapping information and a list 64 of CREATE/MODIFY PERIPHERAL DEVICE DESCRIPTOR(s) that may be combined to create or modify an addressed volume set.

As depicted within table 62, a VOLUME SET CAPACITY field is provided which specifies the size to configure the volume set in logical blocks. If the CRTMOD bit (see FIG. 3) is a logical one the size of the volume set being modified shall be set to the VOLUME SET CAPACITY.

Next, a NORMAL USER DATA TRANSFER SIZE field is provided which indicates the number of logical blocks the host system will normally request to be transferred upon each user data transfer. A storage subsystem shall treat the NORMAL USER DATA TRANSFER SIZE as an advisory parameter. A NORMAL USER DATA TRANSFER SIZE field of zero indicates that the host system has no information on the estimated size of normal user data transfers.

A PERCENTAGE OF SEQUENTIAL TRANSFERS field indicates the estimated percent of times that a host system will access sequential logical blocks on consecutive user data transfers. The storage subsystem shall treat the PERCENTAGE OF SEQUENTIAL TRANSFERS as an advisory parameter. A PERCENTAGE OF SEQUENTIAL TRANSFERS field of zero indicates that the host system has no information on the sequentiality of user data transfers.

Table 62 also includes a CREATE/MODIFY PERIPHERAL DEVICE DESCRIPTOR field 64 which contains information that the storage subsystem shall use to control the user data mapping within data storage devices. The format of the CREATE/MODIFY PERIPHERAL DEVICE DESCRIPTOR field is set forth within FIG. 6.

Referring now to FIG. 6, there is depicted, in tabular form, a table 66 which specifies the format of the CREATE/MODIFY PERIPHERAL DEVICE DESCRIPTOR field of FIG. 5.

As depicted within table 66, a LUN_P field defines the address of the storage device within which to place user data. All fields within the CREATE/MODIFY PERIPHERAL DEVICE DESCRIPTOR shall be bounded by the addressed storage device. It is not an error for a group of storage devices that define a volume set to contain different parameters within the CREATE/MODIFY PERIPHERAL DEVICE DESCRIPTOR.

Next, the LUN_R field specifies the address of the redundancy group that caused the formation of the ps_extent(s) on the selected storage device.

Finally, the PERCENT OF USER DATA field contains the percentage of the volume set requested capacity that would be associated with the selected redundancy group on the selected storage device (e.g. a value of 20 in the PERCENT OF USER DATA field would cause a SCSI-3 storage controller to configure 20 percent of the requested capacity onto the storage device addressed in the LUN_P field).

Upon a receipt of a SIMPLE CREATE/MODIFY VOLUME SET command set forth in the manner described above, storage subsystem 12 (see FIG. 1) will examine the parameters contained therein and configure a volume set utilizing those parameters. The NORMAL USER DATA TRANSFER SIZE and the PERCENTAGE OF SEQUENTIAL TRANSFER values in combination are utilized by the storage subsystem to determine the user data stripe depth mapping and the amount of read ahead information to transfer from the disk drives. This is accomplished utilizing scalable values for each of these parameters in a manner which will be described in greater detail with respect to FIGS. 7 and 8.

Figure 7:
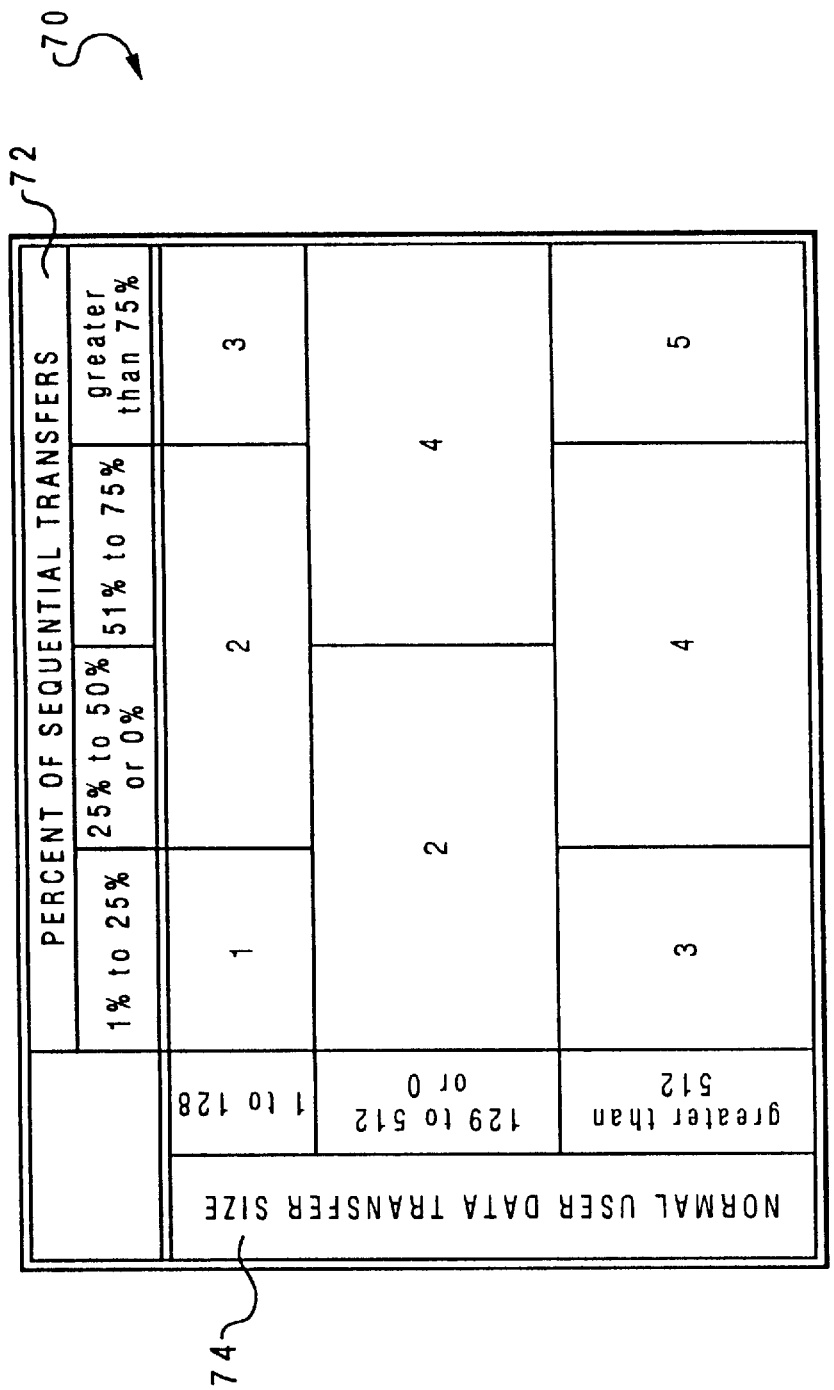
FIG. 7 illustrates, in tabular form, the determination of user data striping depth in response to a specification of estimated user data transfer size and estimated percentage of sequential data transfer in accordance with the method and system of the present invention.

With reference now to FIG. 7, there is depicted, in tabular form, the scalable values associated with NORMAL USER DATA TRANSFER SIZE and the PERCENTAGE OF SEQUENTIAL TRANSFER values which utilize the same algorithms to determine the user data stripe depth. Thus, as set forth within row 72 of table 70, the PERCENTAGE OF SEQUENTIAL TRANSFER may be assigned a scalable value of between one percent and 25 percent, 25 percent to 50 percent, or zero percent, 51 percent to 75 percent or greater than 75 percent. Similarly, as set forth within column 74, the NORMAL USER DATA TRANSFER SIZE is specified as one of three scalable parameters ranging from one block to greater than 512 blocks. Thus, by permitting a user to estimate the PERCENTAGE OF SEQUENTIAL TRANSFERS and NORMAL USER DATA TRANSFER SIZE, the data set forth within table 70 may be utilized to determine the user 20 data stripe depth. In the algorithm set forth within table 70, a value of "1" indicates that the user data stripe depth shall be set to four times the NORMAL USER DATA TRANSFER SIZE. A value of "2" indicates that the user data stripe depth shall be set to twice the NORMAL USER DATA TRANSFER SIZE. Continuing, a value of "3" indicates that the user data stripe depth shall be set equal to the NORMAL USER DATA TRANSFER SIZE. A numerical value of "4" indicates that the user data stripe depth shall be set equal to the NORMAL USER DATA TRANSFER SIZE divided by one half the number of storage devices and finally, a numerical value of "5" indicates that the user data stripe depth shall be set equal to the NORMAL USER DATA TRANSFER SIZE divided by the number of storage devices.

Figure 8:
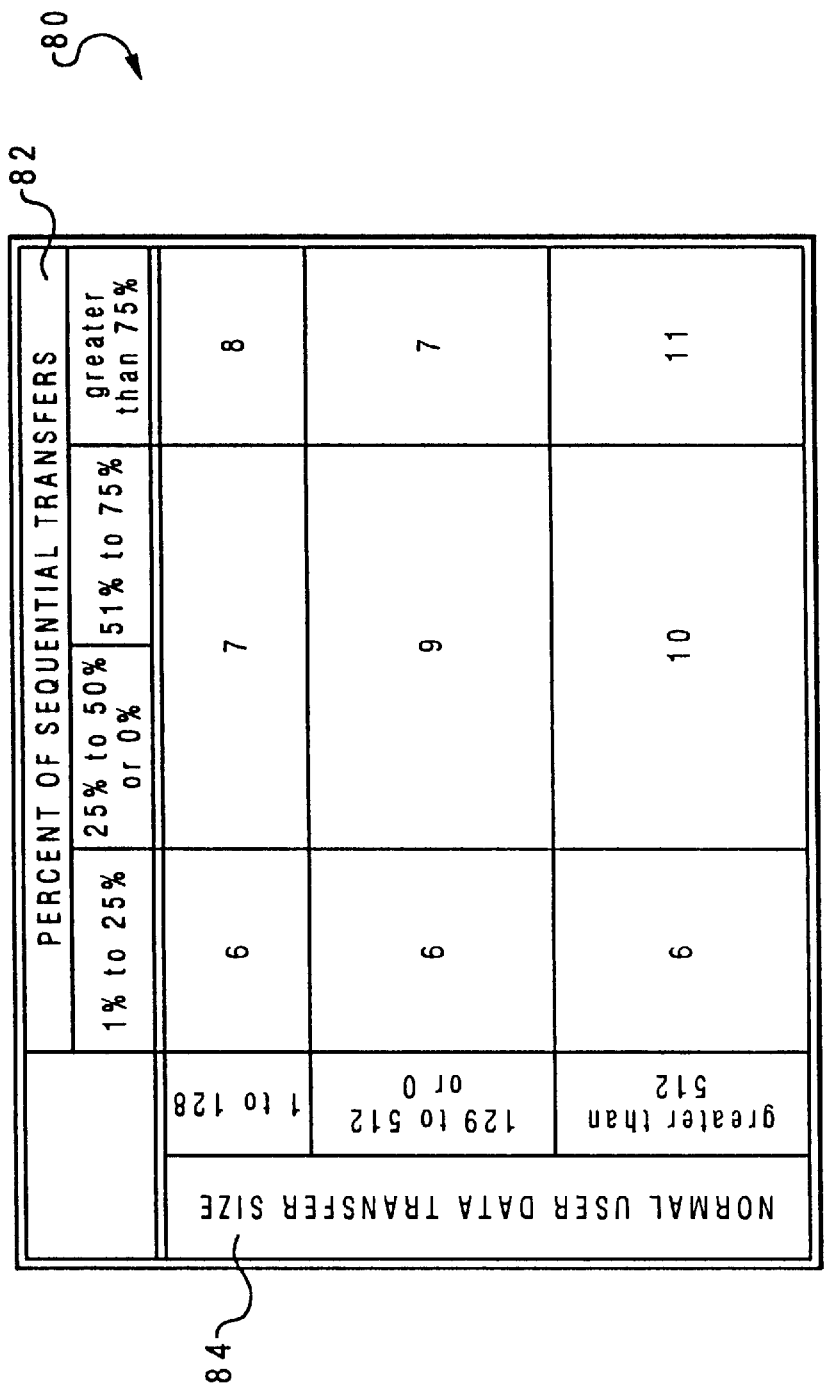
FIG. 8 illustrates, in tabular form, the amount of read ahead information to be transferred in response to specification of estimated user data transfer size and estimated percentage of sequential data transfer in accordance with the method and system of the present invention.

Referring now to FIG. 8, the algorithm for determining the amount of read ahead information to transfer is depicted, in tabular form. As above, the estimated PERCENTAGE OF SEQUENTIAL TRANSFERS is set forth within row 82 as one of four possible scaled values. Similarly, the NORMAL USER DATA TRANSFER SIZE comprises one of three scaled values as set forth in column 84.

As described above, a numerical value of "6" indicates that no logical blocks should be read ahead. A numerical value of "7" indicates that two times the NORMAL USER DATA TRANSFER SIZE in logical blocks should be read ahead. A numerical value of "8" indicates four times the NORMAL USER DATA TRANSFER SIZE in logical blocks should be read ahead. A numerical value of "9" indicates that the number of logical blocks to read ahead is equal to the NORMAL USER DATA TRANSFER SIZE. A numerical value of "10" indicates that the number of logical blocks to read ahead is equal to one half of the NORMAL USER DATA TRANSFER SIZE and finally, a numerical value of "11" indicates that the number of logical blocks to read ahead is equal to the NORMAL USER DATA TRANSFER SIZE up to the maximum cache size.

Figure 9:
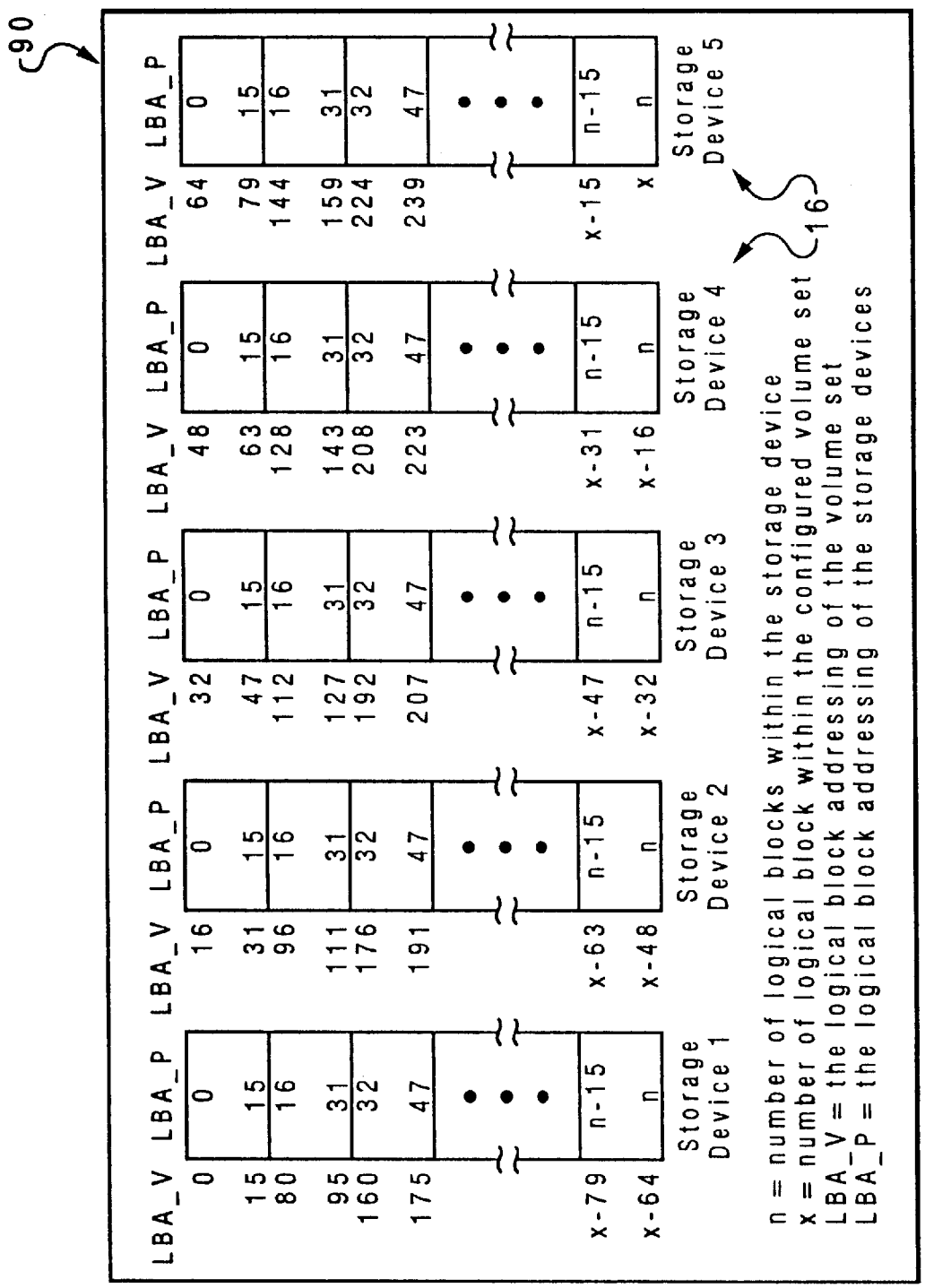
FIG. 9 illustrates, in tabular form, an example of a volume set created within an array of data storage devices in accordance with the method and system of the present invention.

Finally, with reference to FIG. 9, there is illustrated, in tabular form, an example of a volume set which is created within an array of data storage devices in accordance with the method and system of the present invention. The example set forth within FIG. 9 is based upon a presumption that the storage subsystem is communicating with host system which runs applications which normally transfer four kilobytes of data at a time with sequentially user data request occurring 60 percent of the time. In this example, the host will send SIMPLE CREATE/MODIFY VOLUME SET command to the storage subsystem with the NORMAL USER DATA TRANSFER SIZE field set to eight blocks (wherein each block is equal to 512 bytes) and the PERCENTAGE OF SEQUENTIAL DATA TRANSFER field set to 60.

In response to these parameters within the SIMPLE CREATE/MODIFY VOLUME SET command, the storage subsystem will automatically create a volume set with a user data mapping which is illustrated within FIG. 9 wherein n is equal to the number of logical blocks within the storage devices, x is equal to the number of logical blocks within the configured volume set, LBA__V is equal to the logical block addressing of the volume set and LBA_P is equal to the logical block addressing of the storage devices.

Thus, for example, if the application within host system 10 sends a read request for a 4 kilobyte transfer starting with LBA__V 112, then the storage subsystem would read LBA__Ps 16–23 from disk drive 3 and transfer that information to the application. Storage subsystem 12 would also read ahead LBA__Ps 24–31 from storage device 3 and LBA__Ps 16–23 from storage device 4. The read ahead information is placed into the storage subsystem cache in anticipation that the next read from the application within host system 10 will request that information.

Upon reference to the foregoing, those skilled in the art will appreciate that the Applicant has created a novel storage subsystem method and system whereby a plurality of data storage devices may be automatically configured into an appropriate array based upon the estimated size of future data transfers and the amount of sequentiality estimated to be within those future data transfers. In this manner, a user can achieve an appropriate array of storage devices without requiring the user to have a detailed knowledge of the many aspects of storage array configuration, for example, how many disk drive devices are available, how many buses, how many disks on each bus, the range of stripe lengths, interleave depths and extent depths that the storage array supports, etc. This complexity means that there are few users who can properly configure any given manufacturer's storage array and the method and system of the present invention permits the user to configure a storage array into an appropriate array for his or her needs without the necessity of this complex information.

While the invention has been particularly shown and described with reference to a preferred embodiment, it will be understood by those skilled in the art that various changes in form and detail may be made therein without departing from the spirit and scope of the invention.

What is claimed is:

1. A method for efficiently operating a storage subsystem in conjunction with a computer system, said storage subsystem including a storage controller communicating with said computer system and a plurality of data storage devices communicating with said storage controller, wherein said plurality of data storage devices are configurable in a plurality of diverse arrays, said method comprising the steps of:

prompting a user to specify within said computer system at least one data transfer parameter which sets forth an estimated size of future data transfers;

coupling said at least one data transfer parameter to said storage controller; and automatically configuring at least certain of said plurality of data storage devices into an appropriate array for future data transfers in response to receipt of said at least one data transfer parameter.

2. The method for efficiently operating a storage subsystem according to claim 1 wherein said step of prompting a user to specify within said computer system at least one data transfer parameter further comprises the step of prompting a user to specify within said computer system an estimated percentage of future sequential data transfers.

3. A method for efficiently operating a storage subsystem in conjunction with a computer system, said storage subsystem including a storage controller communicating with said computer system and a plurality of data storage devices communicating with said storage controller, wherein said plurality of data storage devices are configurable in a plurality of diverse arrays, said method comprising the steps of:

prompting a user to specify within said computer system at least one data transfer parameter which sets forth an estimated percentage of future sequential data transfers;

coupling said at least one data transfer parameter to said storage controller; and automatically configuring at least certain of said plurality of data storage devices into an appropriate array for future data transfers in response to receipt of said at least one data transfer parameter.

4. A method for efficiently operating a storage subsystem in conjunction with a computer system, said storage subsystem including a storage controller communicating with said computer system and a plurality of data storage devices communicating with said storage controller, wherein said plurality of data storage devices are configurable in a plurality of diverse arrays, said method comprising the steps of:

prompting a user to specify within said computer system at least one data transfer parameter from a plurality of scaled parameters which each set forth an estimated property of future data transfers;

coupling said at least one data transfer parameter to said storage controller; and automatically configuring at least certain of said plurality of data storage devices into an appropriate array for future data transfers in response to receipt of said at least one data transfer parameter.

5. A system for efficiently operating a storage subsystem in conjunction with a computer system, said storage subsystem including a storage controller communicating with said computer system and a plurality of data storage devices communicating with said storage controller, wherein said plurality of data storage devices are configurable in a plurality of diverse arrays, said system comprising:

means for prompting a user to specify within said computer system at least one data transfer parameter which sets forth an estimated size of future data transfers;

means for coupling said at least one data transfer parameter to said storage controller; and means for automatically configuring at least certain of said plurality of data storage devices into an appropriate array for future data transfers in response to receipt of said at least one data transfer parameter.

6. The system for efficiently operating a storage subsystem according to claim 5 wherein said means for prompting a user to specify within said computer system at least one data transfer parameter further comprises means for prompting a user to specify within said computer system an estimated percentage of future sequential data transfers.

7. A system for efficiently operating a storage subsystem in conjunction with a computer system, said storage subsystem including a storage controller communicating with said computer system and a plurality of data storage devices communicating with said storage controller, wherein said plurality of data storage devices are configurable in a plurality of diverse arrays, said system comprising:

means for prompting a user to specify within said computer system at least one data transfer parameter which sets forth an estimated percentage of future sequential data transfers;

means for coupling said at least one data transfer parameter to said storage controller; and means for automatically configuring at least certain of said plurality of data storage devices into an appropriate array for future data transfers in response to receipt of said at least one data transfer parameter.

8. A system for efficiently operating a storage subsystem in conjunction with a computer system, said storage subsystem including a storage controller communicating with said computer system and a plurality of data storage devices communicating with said storage controller, wherein said plurality of data storage devices are configurable in a plurality of diverse arrays, said system comprising:

means for prompting a user to specify within said computer system at least one data transfer parameter from a plurality of scaled parameters which each set forth an estimated property of future data transfers;

means for coupling said at least one data transfer parameter to said storage controller; and means for automatically configuring at least certain of said plurality of data storage devices into an appropriate array for future data transfers in response to receipt of said at least one data transfer parameter.

* * * * *